(12) United States Patent
Bradski

(10) Patent No.: US 8,615,478 B2
(45) Date of Patent: Dec. 24, 2013

(54) USING AFFINITY MEASURES WITH SUPERVISED CLASSIFIERS

(75) Inventor: Gary R. Bradski, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 63 days.

(21) Appl. No.: 13/342,224

(22) Filed: Jan. 3, 2012

(65) Prior Publication Data

US 2012/0109865 A1 May 3, 2012

Related U.S. Application Data

(63) Continuation of application No. 10/857,767, filed on May 28, 2004, now Pat. No. 8,117,143.

(51) Int. Cl.
*G06N 5/00* (2006.01)

(52) U.S. Cl.
USPC .............................................. 706/25; 706/45

(58) Field of Classification Search
USPC ...................................................... 706/25, 45
See application file for complete search history.

(56) References Cited

U.S. PATENT DOCUMENTS

| | | | |
|---|---|---|---|
| 4,924,408 A | 5/1990 | Highland | |
| 5,754,939 A | 5/1998 | Herz et al. | |
| 5,835,087 A | 11/1998 | Herz et al. | |
| 7,130,833 B2 | 10/2006 | Kashima et al. | |

OTHER PUBLICATIONS

Garza, Embedology and Neural Estimation for Time Series Prediction, Master's Thesis, Air Force Institute of Technology, 1994, pp. 1-179.*

Chen, et al., Combining Linear Discriminant Functions with Neural Networks for Supervised Learning, Neural Computing & Applications, vol. 6, No. 1, pp. 19-41, 1997.*

Criminisi, et al., Decision Forests for Classification, Regression, Density Estimation, Manifold Learning and Semi-Supervised Learning, Microsoft Research technical report TR-2011-114, 2011, pp. 1-151.*

Bagirov, et al., Feature Selection using Misclassification Counts, Proceedings of the 9th Australasian Data Mining Conference (AusDM'11), 2011, pp. 51-62.*

Sasamoto, Model Tree Analysis With Randomly Generated and Evolved Trees, Doctoral Thesis, The University of Alabama, 2010, pp. 1-145.*

Shental, Noam, "From Unsupervised to Semi-Supervised Learning: Algorithms and Applications," Thesis for the degree of Doctor of Philosophy, Submitted to the Senate of the Hebrew University of Jerusalem, Nov. 2003, 160 pages.

* cited by examiner

*Primary Examiner* — Wilbert L Starks
(74) *Attorney, Agent, or Firm* — Trop, Pruner & Hu, P.C.

(57) ABSTRACT

A non-binary affinity measure between any two data points for a supervised classifier may be determined. For example, affinity measures may be determined for tree, kernel-based, nearest neighbor-based and neural network supervised classifiers. By providing non-binary affinity measures using supervised classifiers, more information may be provided for clustering, analyzing and, particularly, for visualizing the results of data mining.

22 Claims, 6 Drawing Sheets

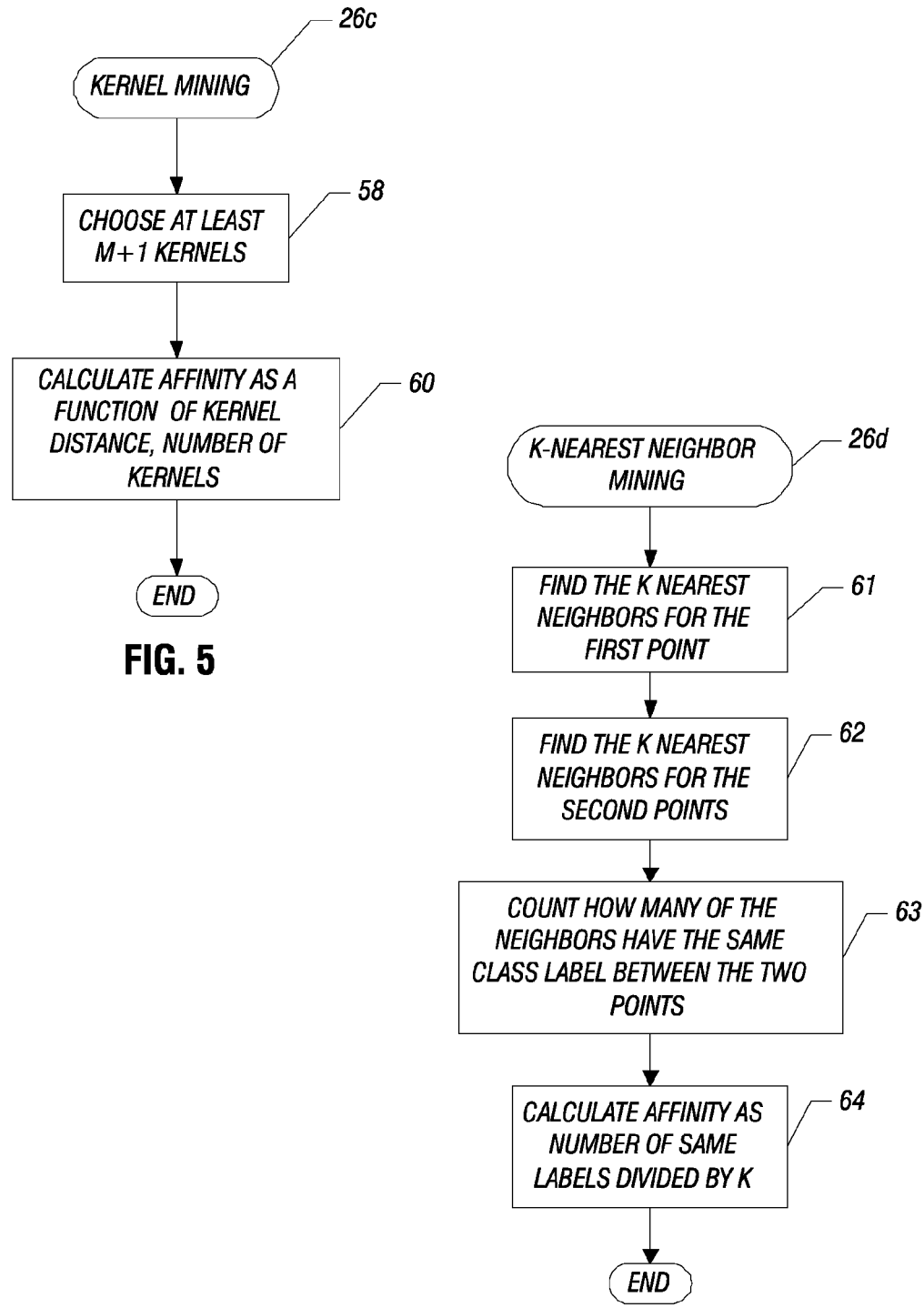

USING AFFINITY MEASURES WITH SUPERVISED CLASSIFIERS

This application is a continuation of U.S. patent application Ser. No. 10/857,767, filed on May 28, 2004, which issued as U.S. Pat. No. 8,117,143 on Feb. 14, 2012.

BACKGROUND

This invention relates generally to data mining.

Data mining involves the statistical analysis of complex data. In one application, data mining technology may be utilized to implement machine learning. Generally, data mining may be used to learn from data. Data features enable predictions to be made. A training set of data may be observed to find the combination and weighting of those features that are determinative of data outcomes of interest. A predictive model is developed to predict a corresponding outcome based on the previously found combination and weighting of features as they appear in new data.

A dataset may include a collection of data points which have a set of features. Supervised data contains labels or predictors. That is, a dataset may contain a collection of features and a label or predictor for those features. As an example, a dataset may include a collection of features about mushrooms, such as cap type, color, texture, and so on, and a label such as edible, poisonous, medicinal, and so on, or a predictor, such as a numeral value representing the toxicity of a mushroom.

A supervised classifier takes as an input the data point features and is trained on and learns to associate the label or predictor of that data point. In a test mode, where only the features of a data point are available, the classifier attempts to produce the correct label or predictor for a data point.

Tree based classifiers make sequential decisions on a selected feature at each branch point in order to arrive at a final label or prediction at the leaves of a tree. A classifier may be used to decide which data points meet a given criteria. At each branch point, data points are sorted into their appropriate branch according to how they meet the criterion. This classification proceeds downwardly from a root or starting point to leaves or ending points. A forest consists of many trees, each of which give a weighted vote for the label or prediction value.

A kernel uses a radial kernel, such as a Gaussian kernel, to measure distances between data points and kernel centers. Kernel methods achieve localization using a weighting function of each kernel that assigns a weight to a data point based on its distance from each kernel center.

Nearest neighbor classifiers associate a label or predictor of a new point with that of its nearest neighboring points. Classification is based on the majority vote of those nearest neighbors.

It would be desirable to quantitatively assess the effectiveness of various supervised classifiers on any given dataset.

BRIEF DESCRIPTION OF THE DRAWINGS

FIG. 5 is a flow chart for software in accordance with one embodiment of the present invention associated with a kernel classifier;

FIG. 6 is a flow chart for software in accordance with one embodiment of the present invention useful with nearest neighbor based classifiers;

DETAILED DESCRIPTION

Figure 1:
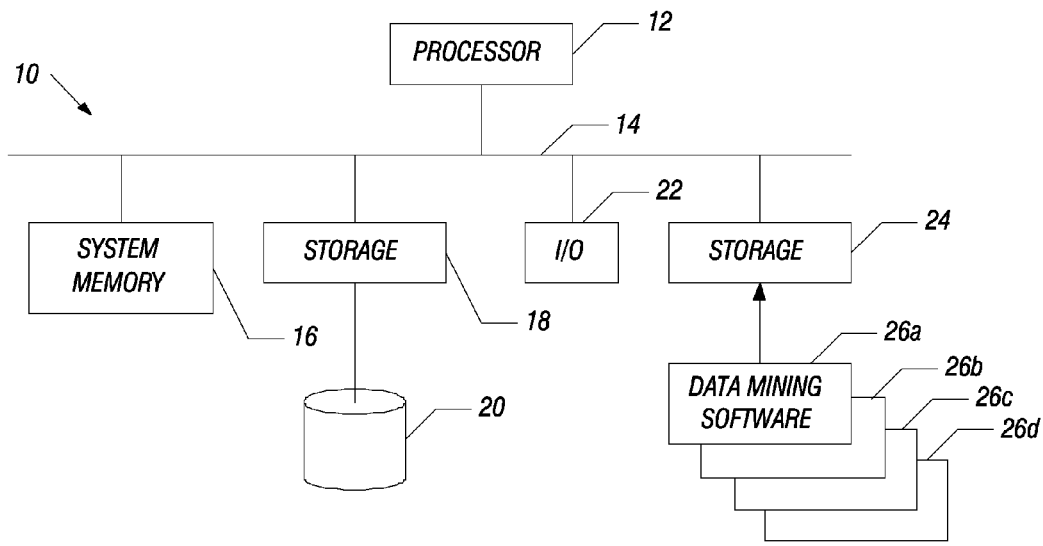
FIG. 1 is a schematic depiction of a computer system in accordance with one embodiment of the present invention.

Referring to FIG. 1, a computer system 10 may include a processor 12 coupled to a bus 14. The system 10 is only an example and the present invention is not limited to any particular architecture. In a simple example, the bus 14 may be coupled to system memory 16, a storage 18, an input/output device 22, and another storage 24. The storage 24 may store various software, including data mining software 26a, 26b, 26c, and 26d. Data to be classified may be stored in a database 20 associated with the storage 18.

Figure 2:
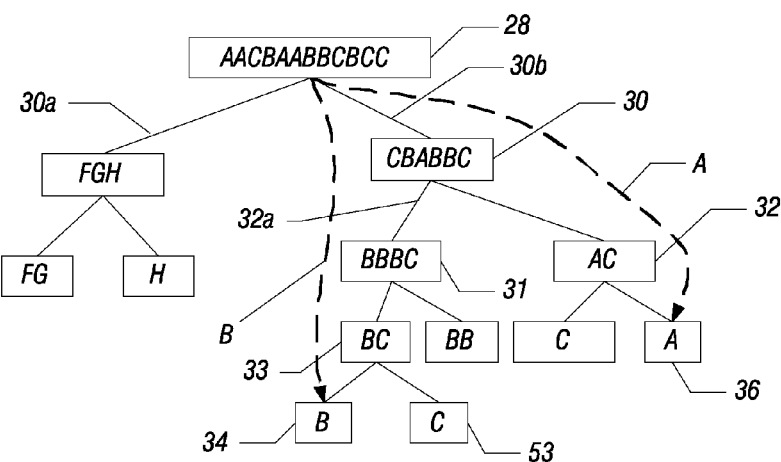
FIG. 2 illustrates a binary decision tree supervised classifier in accordance with one embodiment of the present invention.

Referring to FIG. 2, a tree based classifier includes a root 28 and branches indicated at 30 and 32. Thus, a root dataset 28 may be progressively classified into branches using a decision criterion. At each decision or branching point, the decision criterion is applied. The most common decision criterion is to find a function of the features that best separates the data into like groups, each group of which is then assigned to follow its corresponding branch at that point. The tree based classifier enables one to select or distinguish between data. For example, some data may have features that may be more relevant or more pertinent than other data. The data's relevancy may be specified by a classifier that enables the data to be assessed.

Generally, a tree based classifier may use multiple branches at each branching point. Most commonly and to be concrete, we discuss a binary decision tree below where there can only be two choices at each branch point: Follow the "left" branch or follow the "right" branch. By our convention, call the left branches 30a, 32a of the tree the "yes" branches and the right branches 30b, 32b of the tree the "no" branches. That is, data with features that meet the classification criteria are placed in the left branch and data that does not meet those criteria are placed in the right branch. The classification criteria (which is not shown in FIG. 2) is applied at the branching point between branches.

Thus, the initial dataset AACBAABBCBCC at the root 28 may be subjected to a tree based classification. By our convention here, the repeats of the data points "A", "B" and "C" are meant to represent different data that share strong relationship with each other in their respective groups. The data (AACACB) that satisfies a first classifier is put into the left branch 30a, while the data (CBAEBC) that does not satisfy the classifier is put into the right branch 30b. In this way, the data can be uniquely classified in a relatively easily visualized format.

Once a tree has been formed, it is desirable to create an affinity measure between two data points, such as points A and B in FIG. 2. An affinity measure may be bounded between total affinity (one) and no affinity (zero). The affinity measure quantifies the degree of relatedness of two data points, as determined by the selected classifier.

In order to determine affinity between two data points A and B, the points are fed into the root 28 of the tree and are subjected to a tree based classification until the data points ultimately classify into the same leaf or 2 different leaves. In the case illustrated in FIG. 2, the data point A ends up in the leaf 36. The data point B ends up in the leaf 34.

In a first method, the affinity measure is determined by whether the data points would take the same (count 1) or different (count 0) branch at each branch point in the "paths" through the tree taken by both points divided by the total number of branch points visited.

In the case of the data points A and B, starting at the first branch at the root 28 in FIG. 2, there are 5 branch points (28, 30, 31, 32, and 33) in total traversed by either or both the two points before they reach the leaves 34 (for B) and 36 (for A). Assign this count to the variable TB (total branches). Each data point is then compared at each branch point. The total number of times the two points branch the same way are counted and assigned to the variable TS (total same). Let us assume that the branch decision was the same at 3 branch points (28, 32 and 33) so that TS=3. The affinity is then TS/TB=3/5.

For comparison purposes, the affinity measure for points B in leaf node 34 and C in leaf node 35 is 3/4 because there are 4 branch points but the two data points only differ at the last one (branch 33). It may be readily seen from FIG. 2 that points B and C are more similarly classified than points A and B.

More coarse affinity measures may be defined such as adding up the total number of branch points taken by each of two points separately, call this TB2 (Total Branches 2 points). Then count the number of branches starting from the root (as branch one) taken by the two points until they first differ or hit a leaf node. Call this number TBS (Total Branches Same). The affinity measure would then be 2*TBS/TB2. In the case of points A and B, TB2=4 (for B)+3 (for A)=7. TBS=1 (root node only). So the affinity measure would be 2/7.

This second method is more coarse than the first method because even though 2 points might take different branches early on, later branches might have been the same if the points had taken the same path. Thus our first method is more accurate.

The coarsest affinity measure that we can define would be a binary measure of simply seeing if two points end up in the same leaf (affinity 1) or not (affinity 0). In this case, the affinity for points A and B in FIG. 2 would be zero.

For accuracy, the first affinity measure described is preferred. This first affinity measure is non-binary. It is not merely 0 or 1, but it may be 0, 1, or a value in between. Such an affinity measure can be described as non-binary or analog because it can take more than the two values 0 or 1. A nonbinary or analog affinity measure provides more information than a binary affinity measure.

Figure 3:
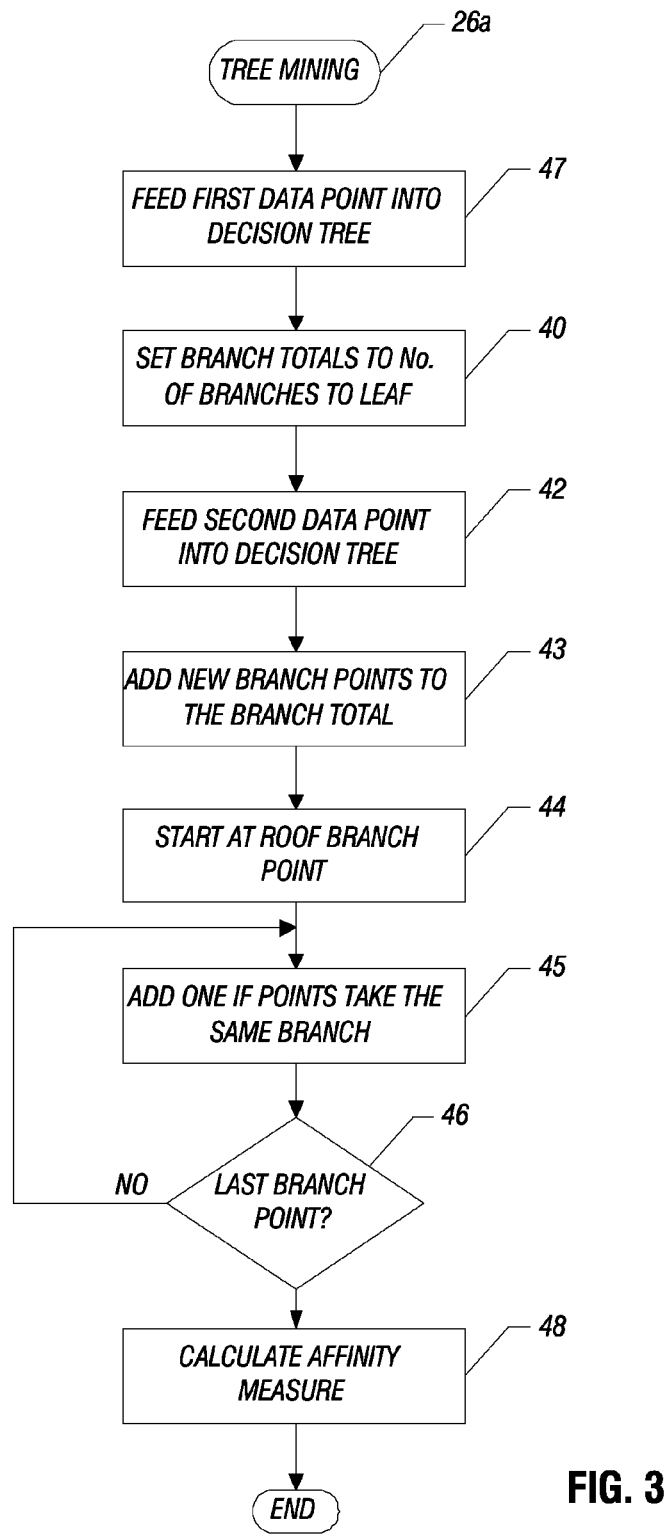
FIG. 3 is a flow chart for software for implementing one embodiment of the present invention in connection with a tree classifier.

Referring to FIG. 3, the software 26a for implementing the affinity measure for a tree classifier begins by feeding the first data point into the decision tree as indicated in block 47. The total number of branch points to the leaf for the first data point is counted and stored in a variable TB (Total Branches) in block 40. Then the second data point is fed into the decision tree as indicated in block 42. Any new branch points taken by the second point, but not the first, are added to the TB variable in block 43. Start at the root branch point, setting number of branches the same variable, TS=0 in block 44. At a branch point, if the two data points would take the same branch, add one to TS in block 45. If we are on the last branch point, exit or else go to block 45 in block 46. Calculate the affinity measure, TS/TB in block 48.

In some embodiments of the present invention, because a non-binary affinity measure is used for a tree based classifier, a better determination of the quality of the classifier may be achieved. In contrast, with a binary approach, relatively little information may be learned. Many data points may have the same affinity measure with a binary technique and, thus, relatively little information about the differences between the points may be obtained. Conversely, many data points may be almost identical except for one branch point but still be assigned an affinity of zero. These differences may be particularly useful when using spectral clustering to cluster or to visualize the data by laying the data out in a two-dimensional distant plot where each data point is placed at one minus the affinity distance from one another.

Figure 4:
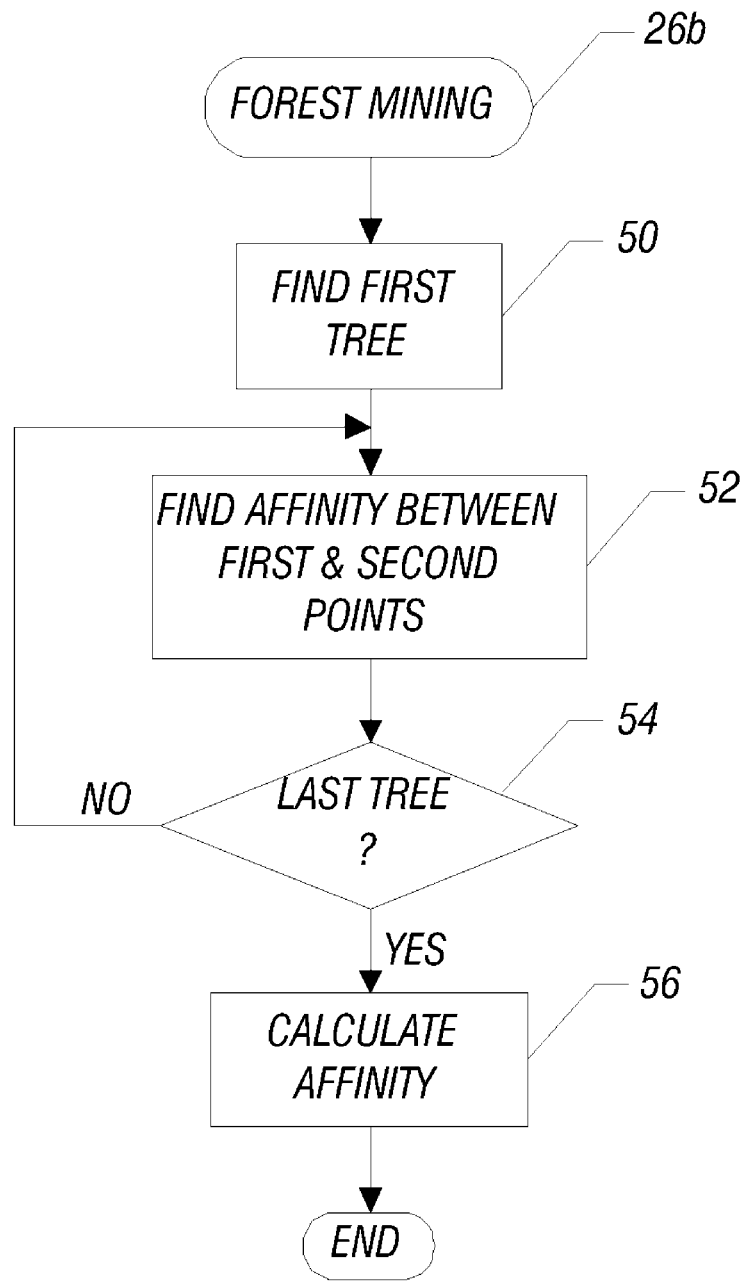
FIG. 4 is a flow chart for software in accordance with one embodiment of the present invention useful in connection with a forest.

Referring to FIG. 4, in connection with forest mining, a statistical boosting method may be used to form a weighted set of many decision trees known as a forest of trees. The weights are used to classify or predict new points by giving each tree a weighted vote. The weights typically sum to one in a decision forest. The affinity measure between two points may then be developed as follows. N may be the total number of trees in the forest. For each tree in the forest, the affinity between a point A and a point B may be found as described in FIG. 3. Then the final affinity measure is the sum of all the affinities weighted by each tree's vote. In cases where the weights do not sum to one in a forest of trees, we must further divide the affinity by the sum of all of the weights.

Referring to FIG. 4, the forest mining software 26b begins by finding a first tree as indicated in block 50. Then one finds the affinity between the first and second points as explained in FIG. 3 and as indicated in block 52. A check at diamond 54 determines if the last tree in the forest has been analyzed. If not, the flow iterates. Once all of the trees have been analyzed, the affinity for the whole tree is calculated as indicated at diamond 56.

Other supervised classifiers may also be amenable to a non-binary affinity calculation. For example, radial basis, Parzen or other kernel density based classifiers use a kernel distance measure to each kernel center. That measure is bounded between 0 and 1 in some embodiments. If the kernel distance measure is not between 0 and 1, the distance is shifted and normalized to lie between 0 and 1.

Taking N to be the number of chosen kernels and KD to be the kernel distance of a point from the kernel's center, the affinity Af(A,B) between two points A and B may be found as follows. If there are M dimensions in the data space, it is advantageous to choose at least M+1 kernels to disambiguate symmetric distances. The affinity then is equal to $$Af(A, B) = 1 - \frac{1}{N}\sum_{i=1}^{N}|K_i(A) - K_i(B)|$$

where $K_i(X)$ gives the kernel distance from kernel i to a point X, and N is at least M+1.

By choosing the number of kernels to be at least M+1, in the worst case, M kernels will disambiguate a point up to a symmetry and one more kernel is needed to disambiguate the symmetry.

Thus, referring to FIG. 5, the kernel data mining software 26c initially chooses the number of kernels as indicated in block 58. Then the affinity is measured as a function of kernel distances from a number of kernels indicated in block 60.

In a K-nearest neighbor based classifier, new points are classified by taking the majority class label out of the "K"

nearest labeled points surrounding the new point. Affinities can then be measured as follows: Count how many of the K nearest neighbors around each point have the same class labels, call this variable TS (Total Same). The affinity is then TS/K.

Referring to FIG. 6, the software 26d, to find affinities between two points using a K-nearest neighbor classifier, begin by finding the K nearest neighbors for the first point in block 61. Find the K nearest neighbors for the second point in block 62. Count how many duplicate class labels exist between the K nearest points around each of the two data points and call this count TS (total same) in block 63. Calculate the affinity as TS/K in block 64.

Neural network classifiers process data through several layers of multiple units or "nodes" each of which combine weighted inputs from the previous layer passed through a nonlinear function. The nonlinear function typically limits output to be between −1 and 1, or between 0 and 1. The first layer processes the raw input features, the last layer is the classifier output which can be binary, integer, real valued or a combination of these types.

Figure 7:
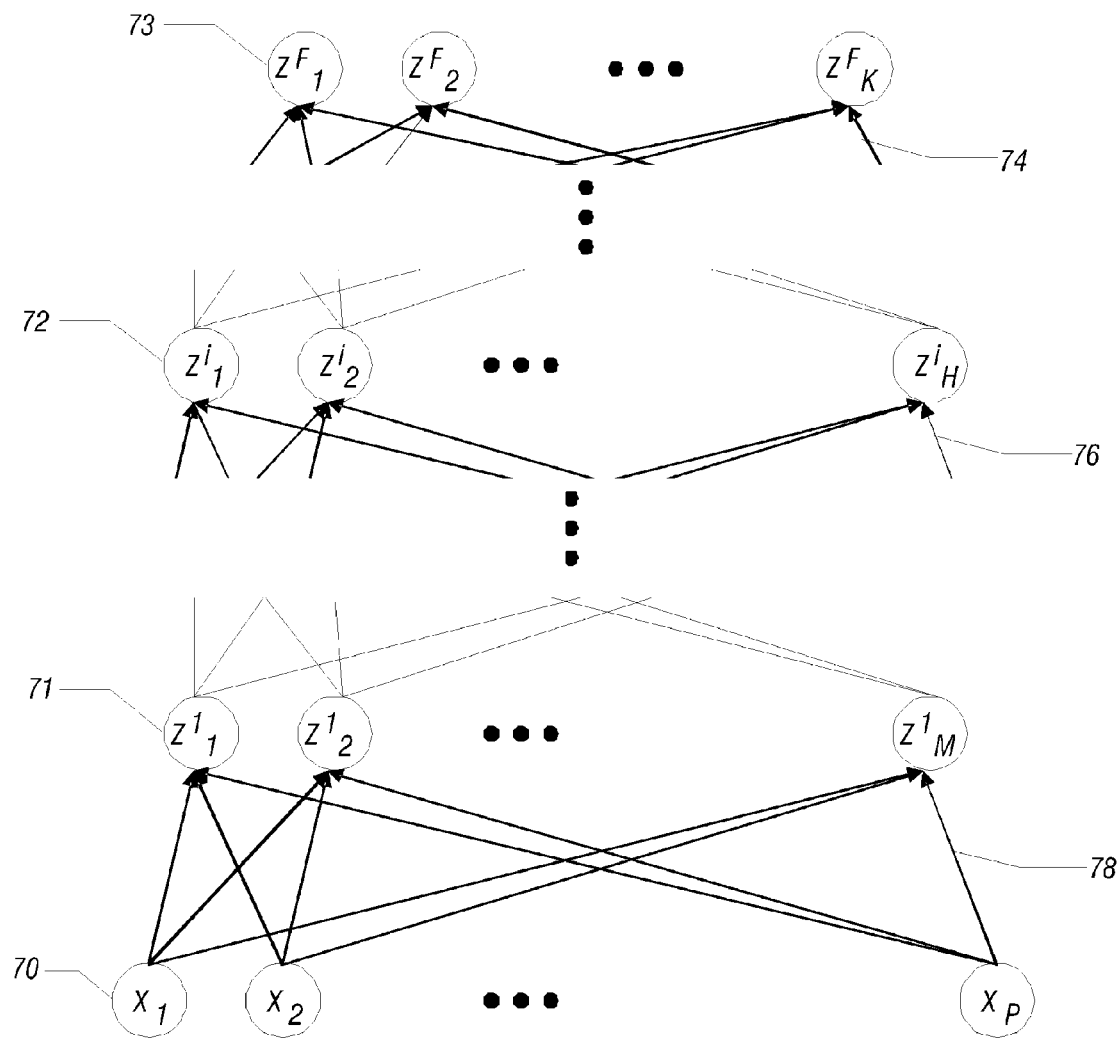
FIG. 7 illustrates a neural network based classifier in accordance with one embodiment of the present invention.

Referring to FIG. 7, a neural network based classifier includes and input layer 70 of variables $X_i$ where i goes from 1 to P. There can be several internal layers 71, 72 with a final output layer 73 where classification decision are registered. The number of nodes in each layer can vary as shown 1 to N in the first layer 71 and 1 to H in the layer 72 and finally 1 to K in the output layer 73. Each layer receives weighted input from the layer below it as shown by 74, 76 and 78. The equation for the output at each layer "i" is of the form:

$$Z_h^i = \sigma_k^i(\alpha_{0k}^i + \alpha_k^{iT}X), k=1,\ldots,K.$$

In this equation, σ is a nonlinear function, typically a "squashing" function that limits output between −1 and 1, or 0 and 1. The weight vector 76 labeled as $\alpha_k$ in the equation go from nodes in the layer below into the $k^{th}$ node of the $i^{th}$ layer. In the equation, "T" denotes vector transpose. Note that there is allowance for a "bias weight" $\alpha_0$ in each layer which allows for an offset constant into the node. A learning algorithm not shown, sets the weights in the neural network to best match the supervised labels associated with each input data vector point in the training set of data. The data, $X_p$ in the input 70 are thus successively transformed by one to several layers, each of which may be of variable number of nodes until output classifications, 1 to K are computed in the final layer 73.

Once a neural network classifier is trained, it is desirable to be able to measure affinities between data points using the classifier. The affinity "Af" between any two data points, A and B can be calculated from the output layer by the following equation:

$$Af(A, B) = 1 - \frac{1}{K}\sum_{k=1}^{K} |\|Z_k^F(A)\|_{0-1} - \|Z_k^F(B)\|_{0-1}|.$$

In the equation above, the double bar norms represent normalization or scaling to limit the output between 0 and 1.

Figure 8:
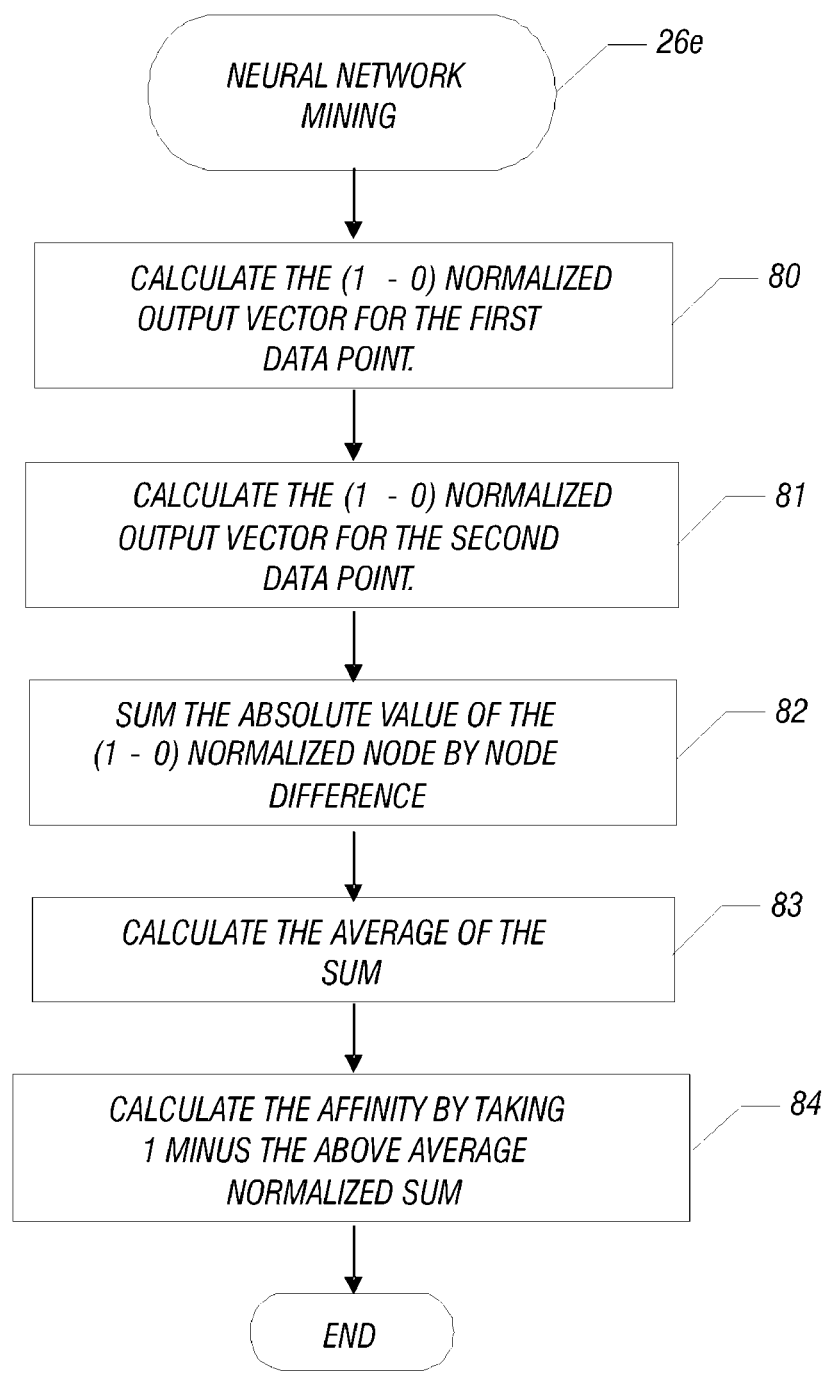
FIG. 8 is a flow chart for software in accordance with one embodiment of the present invention associated with neural network classifiers.

Referring to FIG. 8, the software 26e for implementing the affinity measure for a neural network classifier begins by feeding the first data point into the neural network classifier as indicated in block 80. The output nodes are rescaled to lie between 0 and 1. The second data point is input and the resultant output nodes are rescaled to lie between 0 and 1 in block 81. The sum of the absolute value of the 0-1 rescaled node by node output difference between the first and second data points is computed in block 82. The average of this sum is computed in block 83 and the affinity is 1 minus this amount in block 84.

Once we have the affinities between each of N data points, we can see that there must be $(N^2/2)-N$ possible affinities that were computed in total ($N^2/2$ since affinities are symmetric between two points, −N because affinity between a point and itself is always 1). However, since affinities are expressed in two dimensions, it may suffice to define three non-co-linear points by which every other point may be triangulated. In such case, the affinity of every point may be measured to three chosen points for a total of 3N−3 affinities to be computed. These affinities may be used to cluster the points according to spectral clustering techniques and/or to plot the points in 2 dimensions in order to visualize the relationships that exist between the data points.

While the present invention has been described with respect to a limited number of embodiments, those skilled in the art will appreciate numerous modifications and variations there from. It is intended that the appended claims cover all such modifications and variations as fall within the true spirit and scope of this present invention.

What is claimed is:

1. A method comprising:
electronically developing a kernel based supervised classifier;
determining a kernel based supervised classifier;
choosing the number of kernels to equal the number of dimensions in a data space plus one;
electronically determining a non-binary affinity measure between two data points using said supervised classifier; and
electronically providing a visualization of the relationships between data points using said non-binary affinity measure.

2. The method of claim 1 including developing a tree based supervised classifier.

3. The method of claim 2 wherein determining a non-binary affinity measure includes determining whether the two data points would take the same or different branch at each branch point in a pass through a tree taken by both points, accruing one point each time the same branch is taken, and determining the total number of points divided by the total number of branch points visited.

4. The method of claim 2 including developing a forest supervised classifier.

5. The method of claim 4 including summing the affinity between said first and second points in each tree of the forest and averaging the result.

6. The method of claim 1 including determining a nearest neighbor based supervised classifier.

7. The method of claim 6 including finding the nearest neighbors to said first point, finding the nearest neighbors to the second point and counting how many of the neighbors have the same class label between the two points.

8. The method of claim 7 including determining the affinity as the ratio of the number of nearest neighbors to each point divided into the number of neighbors that have the same class label between the two points.

9. The method of claim 1 wherein determining a non-binary affinity measure includes taking one minus the average absolute value of a node by node difference of 0-1 scaled outputs between the two data points.

10. An article comprising a medium storing instructions that, if executed, enable a processor-based system to:
develop a tree based supervised classifier;

determine whether the two data points would take the same or different branch at each branch point in a pass through a tree taken by both points;

accrue one point each time the same branch is taken;

determine the total number of points divided by the total number of branch points visited;

determine a non-binary affinity measure between data points using said supervised classifier; and provide a visualization of the relationships between data points using said non-binary affinity measure.

11. The article of claim 10 further storing instructions that, if executed, enable the processor-based system to develop a forest supervised classifier.

12. The article of claim 11 further storing instructions that, if executed, enable the processor-based system to sum the affinity between said first and second points in each tree of the forest and take the average as the result.

13. The article of claim 10 further storing instructions that, if executed, enable the processor-based system to determine a kernel based supervised classifier.

14. The article of claim 13 further storing instructions that, if executed, enable a processor-based system to set the number of kernels to equal the number of dimensions in a data space plus one.

15. The article of claim 10 further storing instructions that, if executed, enable the processor-based system to determine a nearest neighbor based supervised classifier.

16. The article of claim 15 further storing instructions that, if executed, enable the processor-based system to find the nearest neighbors to the first point, find the nearest neighbors to the second point, and count how many of the neighbors have the same class label between the two points.

17. The article of claim 16 further storing instructions that, if executed, enable the processor-based system to determine the affinity as a ratio of the number of nearest neighbors to each point divided into the number of neighbors that have the same class label between the two points.

18. The article of claim 10 further storing instructions that, if executed, enable the processor-based system to take one minus the average absolute value of a node by node difference of 0-1 scaled outputs between the two data points.

19. A system comprising:

a processor; and a storage coupled to said processor, the storage storing instructions to develop a forest supervised classifier, sum the affinity between said first and second points in each tree of the forest and average the result and determine a non-binary affinity measure between two data points using the supervised classifier, and provide a visualization of the relationships between data points using said non-binary affinity measure.

20. The system of claim 19 wherein said storage stores instructions to develop a tree based supervised classifier.

21. The system of claim 19 wherein said storage stores instructions to develop a forest supervised classifier.

22. The system of claim 19 wherein said storage stores instructions to determine a kernel based supervised classifier.

\* \* \* \* \*